United States Patent [19]
Glitho

[11] Patent Number: 5,870,565
[45] Date of Patent: Feb. 9, 1999

[54] TELECOMMUNICATIONS MANAGEMENT NETWORK CONNECTED TO A COMMON CHANNEL SIGNALING NETWORK

[75] Inventor: Roch Glitho, Montreal, Canada

[73] Assignee: Telefonaktiebolaget L M Ericsson (publ), Stockholm, Sweden

[21] Appl. No.: 643,803

[22] Filed: May 6, 1996

[51] Int. Cl.$^6$ .................................................. H04L 12/66
[52] U.S. Cl. ..................................... 395/200.79; 370/401
[58] Field of Search ........................ 395/200.02, 200.11, 395/200.13, 200.2, 200.15, 200.48, 200.53, 200.79; 375/522; 370/400, 410, 401; 379/230, 207, 9, 221, 14

[56] References Cited

U.S. PATENT DOCUMENTS

| | | | |
|---|---|---|---|
| 4,970,721 | 11/1990 | Aczel et al. | 370/355 |
| 4,979,118 | 12/1990 | Kheradpir | 379/221 |
| 4,991,133 | 2/1991 | Davis et al. | 395/200.2 |
| 5,159,592 | 10/1992 | Perkins | 370/338 |
| 5,193,110 | 3/1993 | Jones et al. | 379/94 |
| 5,333,178 | 7/1994 | Norell | 379/59 |
| 5,408,419 | 4/1995 | Wong | 455/33.1 |
| 5,423,003 | 6/1995 | Berteau | 395/200.13 |
| 5,469,500 | 11/1995 | Satter et al. | 379/201 |
| 5,481,673 | 1/1996 | Michelson | 395/200.15 |
| 5,602,991 | 2/1997 | Berteau | 395/200.13 |

OTHER PUBLICATIONS

B. Panigas, et al., "TMN Pilot Application Functions," *Proceedings of the International Switching Symposium*, 28 (May 1990), pp. 147–153.

L. Bertfelt, et al., "An Integrated TMN Solution—Eripax and TMOS," *Ericsson Review*, 71 (1994), pp. 49–56.

M. Ahrens, "Key Challenges in Distributed Management of Braodband Transport Networks," *IEEE Journal on Selected Areas in Communication*, 12 (Aug. 1994), 991–999.

I.S. Bedi, et al., "Interworking CCITT No. 7 with the TMN," *IEE Colloquim on 'Developments In Signalling,'* (Nov. 1993) pp. 9/1–9/7.

Jonathan L. Wang, Traffic Routing and Performance Analysis of the Common Channel Signaling System 7 Network, IEEE, pp. 301–305, Dec. 1991.

Glitho, Isolating Faulty Routing Tables in SS7 Networks: Present and Future, May 1996, pp. 98–104.

Glitho, Telecommunications Management Network: Vision vs. reality, Mar. 1995, pp. 47–52.

El–Toumi et al., Interconnecting SS7 Signaling Networks, 1990, pp. 589–593.

Knight, The Evolution of the SS7 Signaling Transfer Point in Broadband (ATM) and Intelligent Network Environment, 1995, pp. 6/1–6/10.

Rappaport, Wireless Communications: Principles & Practice, ©1996, pp. 465–469.

*Primary Examiner*—Parshotam S. Lall
*Assistant Examiner*—Patrice L. Winder
*Attorney, Agent, or Firm*—Jenkens & Gilchrist, P.C.

[57] ABSTRACT

A telecommunications management network (TMN) is directly connected for operation and maintenance data message exchange to a common channel signaling network. The direct connection to the telecommunications management network is made through a gateway one of a plurality of signal transfer points included within the telecommunications network. Addressing and format conversions are effectuated between the transmission control protocol/internet protocol (TCP/IP) used for the telecommunications management network operation and maintenance messages and the common channel signaling—signaling system no. 7 messages. The telecommunications management network and each of the network element nodes are accordingly assigned both an internet protocol address and a signaling system no. 7 (SS7) address. Static tables maintained in certain ones of the signal transfer points map internet protocol addresses and signaling system no. 7 (SS7) address against each other for message routing.

15 Claims, 4 Drawing Sheets

TELECOMMUNICATIONS MANAGEMENT NETWORK CONNECTED TO A COMMON CHANNEL SIGNALING NETWORK

BACKGROUND OF THE INVENTION

1. Technical Field of the Invention

The present invention relates to telecommunications networks and, in particular, to the operation and maintenance Of a common channel signaling network by means of a telecommunications management network.

2. Description of Related Art

In the telecommunications field, two commonly recognized methods exist for sending signaling messages. The traditional telephone mode, referred to as in-band signaling, transmits signaling messages over the same trunk connections as the information messages or calls themselves. The more modern approach, however, utilizes common channel signaling (CCS) in which control messages or signals are carried over one or more separate signaling channels. Common channel signaling typically utilizes a packet-switched network separate from the voice communications network for transmitting call setup and routing packets, as well as other supervisory and control information and application data. The most commonly utilized technology for implementing common channel signaling is the signaling system no. 7 (SS7).

It is further well known in the telecommunications field to provide a telecommunications management network (TMN) to monitor and maintain the telecommunication network over which calling services are offered to subscribers. Conventionally, a separate data communications network (DCN) is used to connect the telecommunications management network to each switching node (or other network element node) within the telecommunication network that is being monitored. The necessity of installing a separate data communications network in order to provide operation and maintenance services to a telecommunications network comprises a significant drawback. There is a recognized need then for a more efficient and less expensive way of transporting operation and maintenance data.

SUMMARY OF THE INVENTION

The present invention addresses the foregoing and other drawbacks associated with the prior art use of a separate data communications network for providing operation and maintenance services to a telecommunications network. In accordance with the present invention, the separate data communications network for routing operation and maintenance messages to the nodes of the telecommunications network is eliminated. Instead, the existing common channel signaling network is used. A connection is made directly between the telecommunications management network and the common channel signaling network through one of its signal transfer points (STP).

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
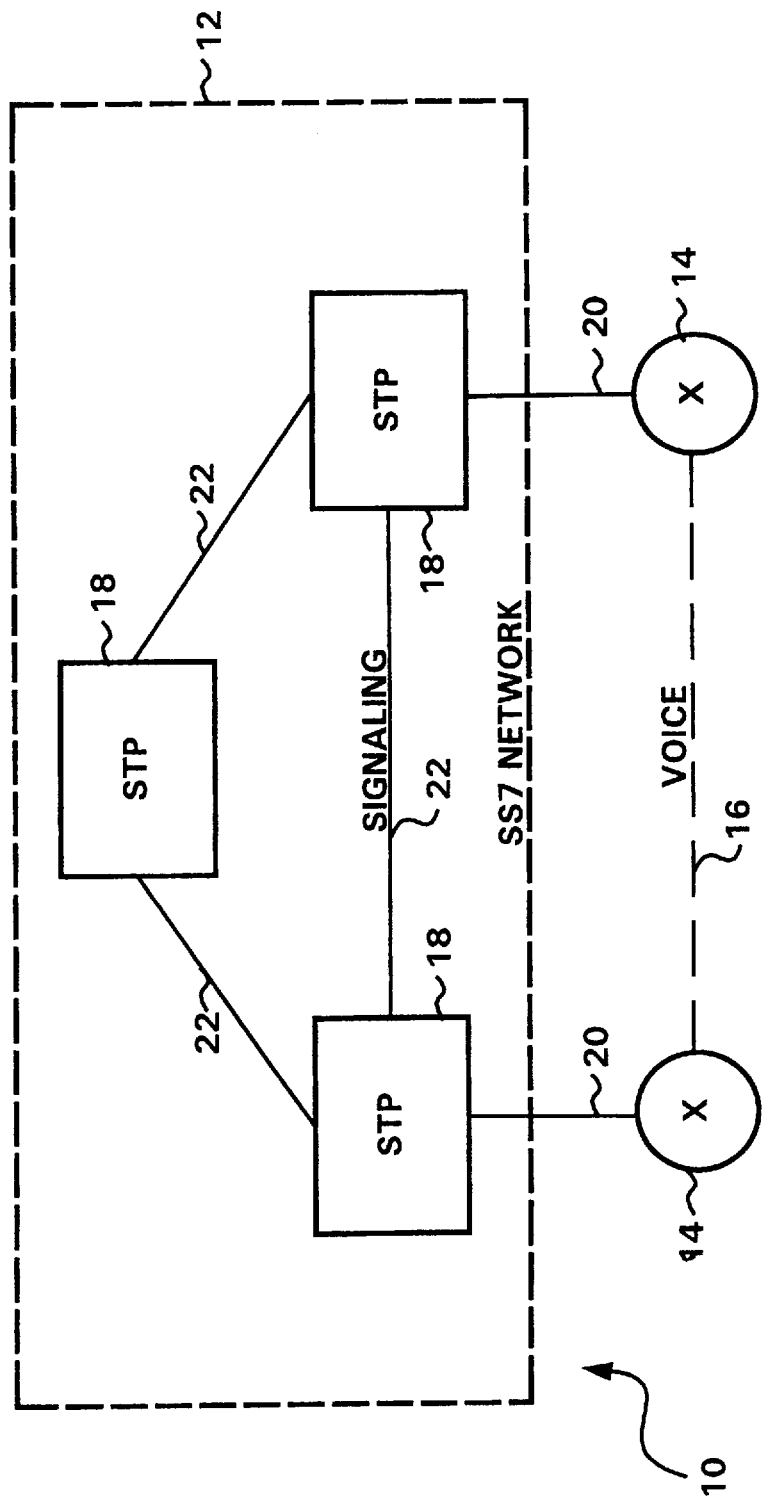
FIG. 1 is a block diagram of a portion of a common channel signaling network.

Reference is now made to FIG. 1 wherein there is shown a block diagram of a portion of a common channel signaling (CCS) network 10. The network 10 includes a plurality of exchanges (X) 14 for providing circuit switched connections to voice trunks 16 during the routing and handling of voice communication call connections. It will be understood that the network 10 likely includes many more exchanges 14 than the two shown. The network 10 further includes a plurality of signal transfer points (STPs) 18 each comprising a specialized packet switch for receiving and transmitting signaling messages separate from the call connections being handled by the exchanges 14. Each exchange 14 is connected for data communication with at least one signal transfer point 18 over a digital A-link 20. Each signal transfer point 18 is further connected for data communication with at least one other signal transfer point over a digital B-link 22. The signal transfer points 18, digital A-links 20 and digital B-links 22 make up a packet switched, common channel signaling network 12 which preferably comprises a common channel signaling—signaling system no. 7 (CCS-SS7) network. Although not shown to simplify the drawing, redundant pairs of signal transfer points 18 are typically provided in association with each exchange 14, and furthermore multiple digital A-link 20 connections between each exchange and its redundant signal transfer points, as well as multiple digital B-link 22 connections at each signal transfer point, are included to support reliability and robustness within the common channel signaling network 12. Further description of the specific operation of the common channel signaling—signaling system no. 7 network 12 will not be provided herein as such is well known to those having ordinary skill in the art.

Figure 2:
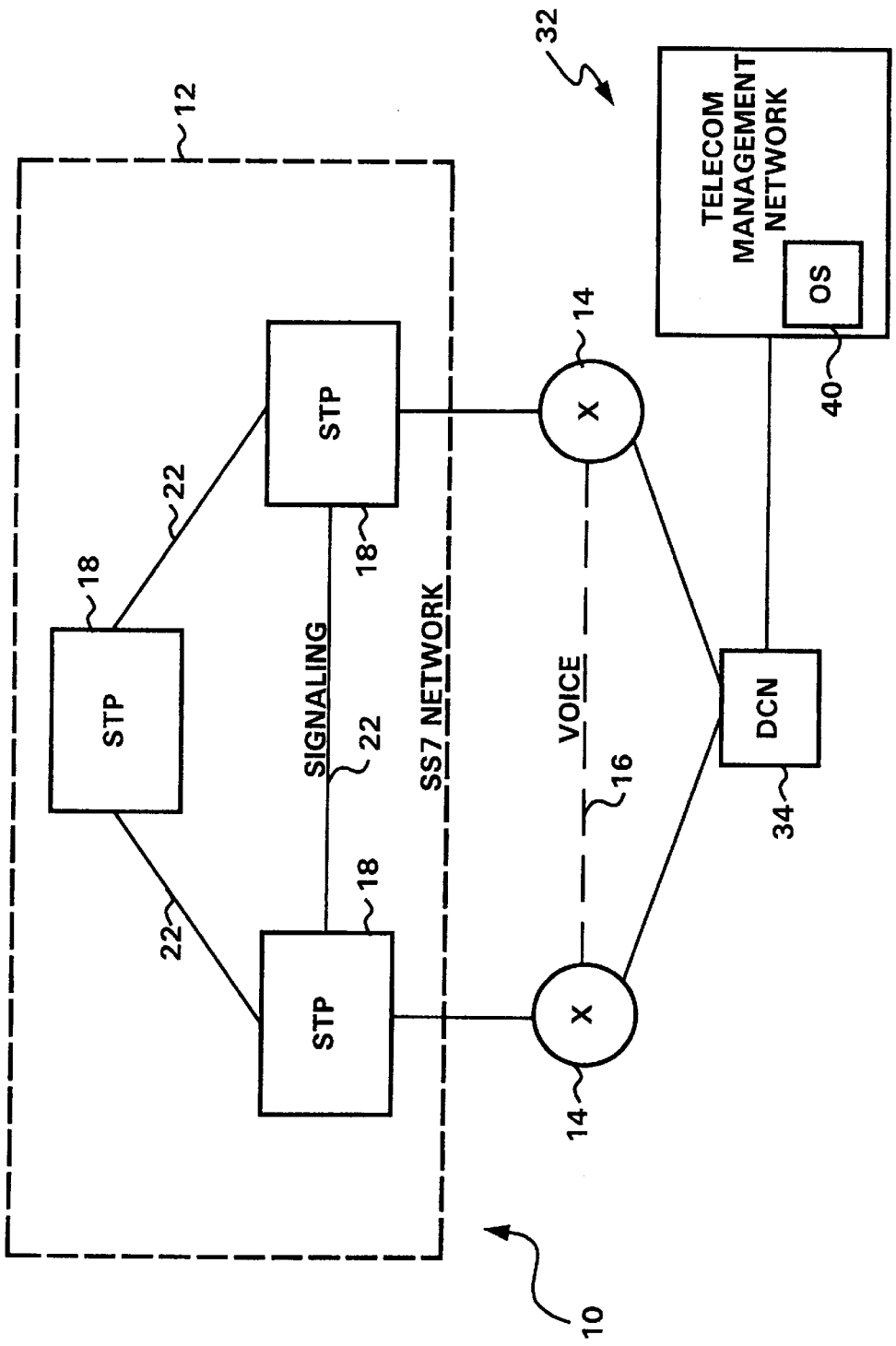
FIG. 2 is a block diagram of a portion of a common channel signaling network connected to a telecommunications management network through a separate data communications network.

Reference is now made to FIG. 2 wherein there is shown a block diagram of a portion of a common channel signaling network 10 (see, also FIG. 1) connected to a telecommunications management network 32 through a separate data communications network 34. By way of the separate data communications network 34, the telecommunications management network 32 is connected to each exchange 14 (and any other appropriate network elements—not shown). Operation of the telecommunications management network 32 is controlled by an operating system (OS) 40. The telecommunications management network 32 communicates operation and maintenance (O&M) messages with the exchanges 14 via an interface commonly referred to as Q3. The Q3 operation and maintenance message traffic is carried between each of the exchanges 14 and the telecommunications management network 32 by way of the data communications network 34 which in common practice utilizes a transmission control protocol/internet protocol (TCP/IP) running on top of either a local area network (LAN) or wide area network (WAN). An example of a commonly used local area network for the data communications network 34 comprises an ethernet network. An example of a commonly utilized wide area network for the data communications network 34 comprises an X.25 network. Other local and wide area networks of a type known to those of ordinary skill in the art are often used to connect the telecommunications management network 32 to the telecommunications network 10.

Figure 3:
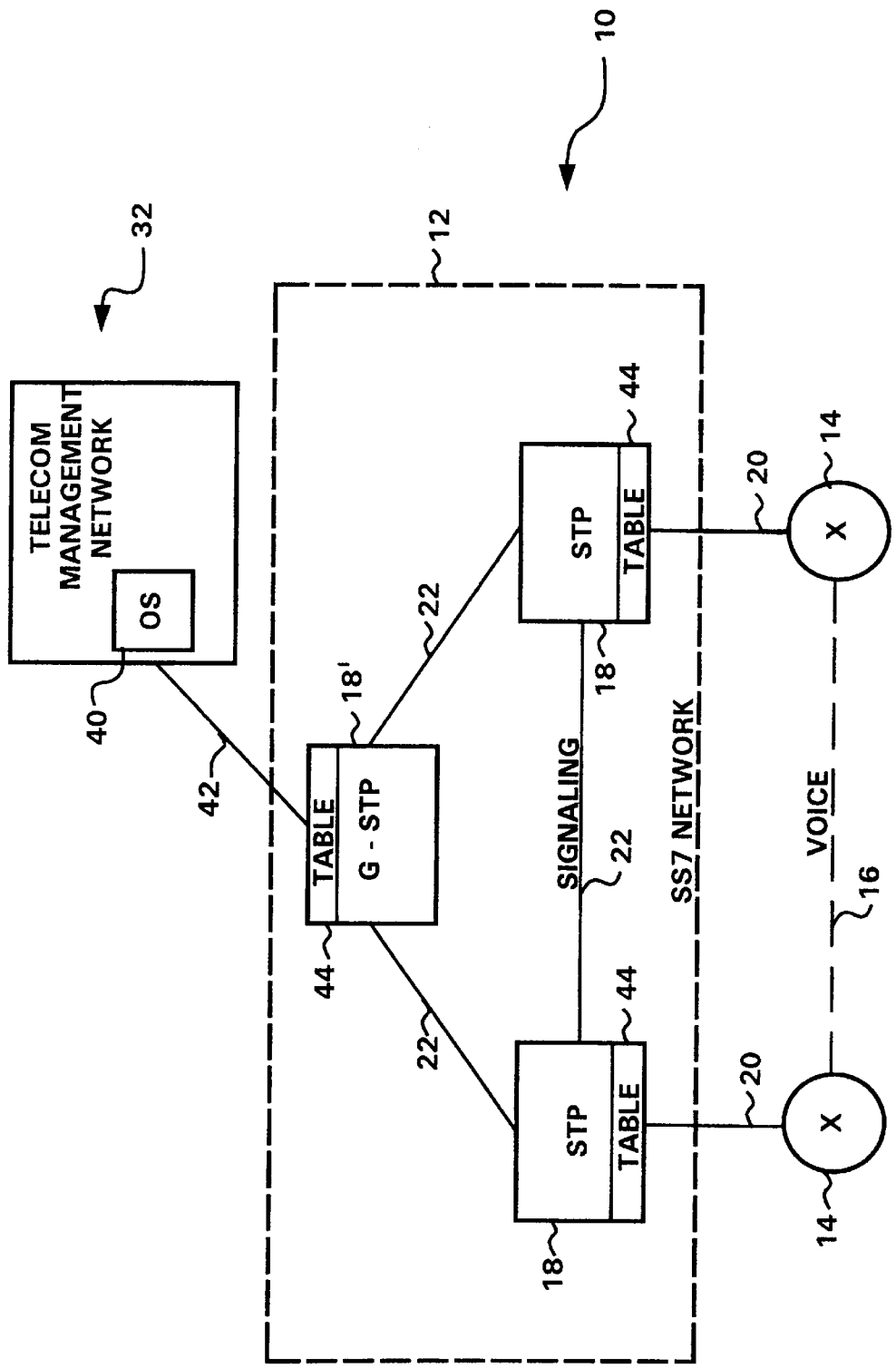
FIG. 3 is a block diagram of a portion of a common channel signaling network directly connected to a telecommunications management network.

Reference is now made to FIG. 3 wherein there is shown a block diagram of a portion of a common channel signaling network 10 (again, see FIG. 1) connected directly to a telecommunications management network 32 without the use of a separate data communications network (see, for comparison, FIG. 2). The telecommunications management network 32 is connected via communications link 42 to a selected O&M gateway signal transfer point (G-STP) 18' which may comprise any conveniently selected one of the plurality of signal transfer points 18 of the signaling system no. 7 network 12. The Q3 operation and maintenance message traffic is thus carried between the telecommunications management network 32 and each of the exchanges 14 via the signaling system no. 7 network 12 and the communications link 42. In this configuration, both the communications link 42 and the signaling system no. 7 network 12 support the transmission of transmission control protocol/internet protocol (TCP/IP) messages. With respect to the common channel signaling system, this is accomplished by having a transmission control protocol/internet protocol (TCP/IP) running on top of the signaling system no. 7 network 12.

Figure 4:
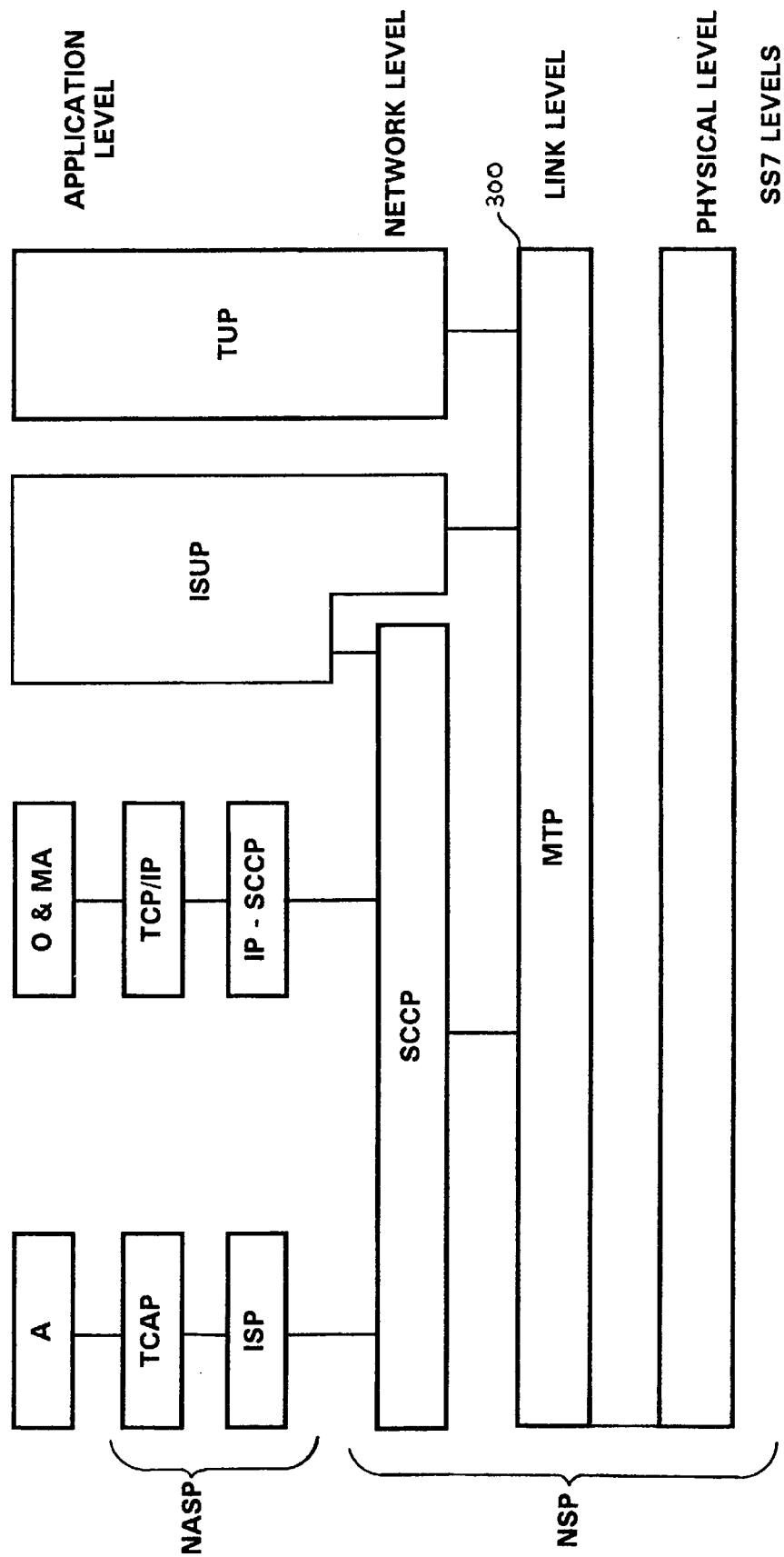
FIG. 4 illustrates the different Open Systems Interconnection (OSI) layers of a common channel signaling—signaling system no. 7 network which supports the transmission of telecommunications management network operation and maintenance messages.

Reference is now made to FIG. 4 wherein there are illustrated the different Open Systems Interconnection (OSI) layers of a common channel signaling—signaling system no. 7 network 12. Signaling system no. 7 has two parts, a user part (UP) and a message transfer part (MTP). The message transfer part (MTP) 300 is the lowest layer of the signaling system no. 7 network, and is used to physically transport packet data. The user part (UP) comes in several varieties, including a Telephone User Part (TUP) for basic telephone service, and an Integrated Service Digital Network (ISDN) User Part (ISUP) for combined voice, data and voice services. These user parts (UP) also utilize the message transfer part (MTP) to provide a connection-less but sequenced transport service. Applications (A) residing at the highest layer of the signaling system no. 7 may utilize the Transaction Capability Application Part (TCAP) and the Intermediate Services Part (ISP), comprising the Network-Application Service Part (NASP) layers, along with the Signaling Connection Control Part (SCCP) and Message Transfer Part (MTP), comprising the Network Service Part (NSP) layers, to transport application layer data from one application to another application.

Reference is now made to both FIG. 3 and FIG. 4. The telecommunications management network 40 operation and maintenance application (O&MA), also known as Common Management Information Service Element (CMISE), utilizes Transmission Control Protocol/Internet Protocol (TCP/IP) message signals, comprising the Network-Application Service Part (NASP) layers, to interface with the Signaling Connection Control Part (SCCP) and Message Transfer Part (MTP), comprising the Network Service Part (NSP) layers, to communicate operation and maintenance message data over the signaling system no. 7 network 12 between the gateway signal transfer point 18' and each of the exchanges 14. In this connection, the transmission control protocol/internet protocol (TCP/IP) operation and maintenance message signals are encapsulated within a Signaling Connection Control Part (SCCP) message and assigned an appropriate signaling system no. 7 address for directing the end-to-end routing of the message to the specified destination within the signaling system no. 7 network 12. This is accomplished through use of an internet protocol (IP) to Signaling Connection Control Part (SCCP) mapper (IP-SCCP) which utilizes a conversion table (see discussion below) for translating between internet protocol addressed and signaling system no. 7 addresses. The signaling system no. 7 addressing information is used by the Message Transfer Part (MTP) at each signal transfer point (STP) in the common channel signaling system to properly route the message signal. Once outside the signaling system no. 7 network 12, for example over the communications link 42, transmission control protocol/internet protocol (TCP/IP) addressing is used.

To facilitate the foregoing routing functionality, the telecommunications management network 32 and each of the exchanges 14 are assigned both an internet protocol address and a signaling system no. 7 address. The operation and maintenance applications within the telecommunications management network 32 and the exchanges 14 use internet protocol addresses to address operation and maintenance messages to each other. The messages are then encapsulated within a Signaling Connection Control Part (SCCP) message, and static tables 44 in the signal transfer points 18 associated with the exchanges 14 and the telecommunications management network 32 map the designated internet protocol addresses to appropriate signaling system no. 7 addresses for message transmission via the signal transfer points 18. Intermediate signal transfer points 18 (not shown) in the signaling system no. 7 network 12 need not include a static table 44. The signal transfer points 18 thus function as internet protocol routers in addition to performing their common channel signaling system routing functions in connection with the operation of the telecommunications network 10. Once on the other side of the signaling system no. 7 network 12, the internet protocol addresses are used to complete routing and delivery of the messages. To insure that operation and maintenance messages do not unduly burden the signaling system no. 7 network 12, these messages are assigned a lowest possible priority and are transmitted only when load conditions allow.

The common channel signaling system network 10 and its signaling system no. 7 network 12 have not previously been used for transporting operation and maintenance messages between the telecommunications management network 32 and the exchanges 14. This is perhaps because operation and maintenance is considered within the domain of data communications rather than signaling. This artificial distinction may have deterred the use of signaling system no. 7 for data transport uses even though common channel signaling systems fill many of the requirements for transporting data such as operation and maintenance message data. The signaling system no. 7 network 12 is, however, preferred for use in connection with the present invention over the prior art separate data communications network 34 (see, FIG. 2) for several reasons. First, the cost conscious service operator desiring to install a telecommunications management network 32 need not also invest in and install a separate data communications network 34 that is subsequently inefficiently used only for operation and maintenance message transmission purposes. Second, the transmission of operation and maintenance messages over the signaling system no. 7 network more efficiently utilizes the available signaling capacity of the existing common channel signaling system. Third, through the digital A-link and B-link connections of the common channel signaling system, the telecommunications management network 32 needs only a single connection through the gateway signal transfer point (G-STP) 18' to reach each individual exchange 14. Other advantages may become apparent through a review of this disclosure and/or are known to those of ordinary skill in the art.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A telecommunications system, comprising:
   a telecommunications network including:
      a plurality of network element nodes interconnected by voice trunks wherein at least one of the network element nodes is a gateway node; and
      a common channel signaling system connected to each of the network element nodes and configured to carry telecommunications application signals, the common channel signaling system supporting a transmission control protocol/internet protocol; and
   a telecommunications management network connected to the at least one gateway node and to the plurality of network element nodes of the telecommunications network through the transmission control protocol/internet protocol of the common channel signaling system, with the transmission control protocol/internet protocol of the common channel signaling system carrying operation and maintenance data messages to and from the telecommunications management network through the gateway node, in addition to the telecommunications application signals carried on the common channel signaling system.

2. The system of claim 1 wherein the common channel signaling system comprises a signaling system no. 7 network.

3. The system of claim 2 wherein the transmission control protocol/internet protocol runs on top of the signaling system no. 7 network to carry the operation and maintenance data messages.

4. The system of claim 3 wherein the telecommunications management network as well as each of the network element nodes is assigned both an internet protocol address and a signaling system no. 7 address.

5. The system of claim 4 wherein the common channel signaling system maps internet protocol addresses to signaling system no. 7 addresses to route the operation and maintenance data messages.

6. The system of claim 5 wherein the common channel signaling system comprises a plurality of interconnected signal transfer points, and the at least one gateway node is a gateway signal transfer point through which a connection is made to the telecommunications management network.

7. The system of claim 6 wherein each of the signal transfer points functions as an internet protocol router for operation and maintenance data messages as well as a signaling system no. 7 router for telecommunications application signals.

8. The system of claim 1 wherein the network element nodes comprise telecommunications exchanges.

9. A telecommunications system, comprising:
   a plurality of voice communications switching nodes interconnected by voice trunks;
   a common channel signaling system comprising a plurality of signal transfer points interconnected by communications links, wherein certain ones of the signal transfer points are connected to certain ones of the plurality of voice communications switching nodes, and wherein one of the signal transfer points comprises a gateway signal transfer point, wherein the common channel signaling system carries telecommunications application signals, the common channel signaling system further supporting a transmission control protocol/internet protocol; and
   a telecommunications management network connected to the gateway signal transfer point for the communication of operation and maintenance data messages with the plurality of voice communications switching nodes via the transmission control protocol/internet protocol supported by the common channel signaling system.

10. The system of claim 9 wherein the common channel signaling system comprises a signaling system no. 7 network.

11. The system of claim 10 wherein the common channel signaling system supports a transmission control protocol/internet protocol running on top of the signaling system no. 7 network.

12. The system of claim 11 wherein the telecommunications management network as well as each of the network element nodes is assigned both an internet protocol address and a signaling system no. 7 address.

13. The system of claim 12 wherein certain ones of signal transfer points include a static table mapping internet protocol addresses to signaling system no. 7 addresses.

14. The system of claim 13 wherein each of the signal transfer points functions as an internet protocol router for operation and maintenance data messages as well as a signaling system no. 7 router for telecommunications application signals.

15. A telecommunications system, comprising:
   a common channel signaling telecommunications network including a plurality of switching nodes interconnected via a plurality of signal transfer points forming a signaling system no. 7 network, the signaling system no. 7 network supporting a transmission control protocol/internet protocol for carrying telecommunications management network operation and maintenance messages, the signal transfer points functioning as an internet protocol router for operation and maintenance data messages as well as a signaling system no. 7 router; and
   a telecommunications management network connected to said common channel signaling telecommunications network via a gateway one of the plurality of signal transfer points.

* * * * *